United States Patent [19]

Meyer

[11] Patent Number: 6,061,155
[45] Date of Patent: May 9, 2000

[54] HIGH AMPLITUDE SIGNAL SUPPLEMENT TO AID RECOVERY OF A LOW AMPLITUDE SIGNAL

[75] Inventor: Stephen R. Meyer, Cedar Rapids, Iowa

[73] Assignee: Intermec IP Corp., Woodland Hills, Calif.

[21] Appl. No.: 08/785,519

[22] Filed: Jan. 17, 1997

Related U.S. Application Data

[60] Provisional application No. 60/011,892, Feb. 20, 1996, and provisional application No. 60/010,230, Jan. 19, 1996.

[51] Int. Cl.[7] .................................................. H04B 10/00
[52] U.S. Cl. .......................... 359/110; 359/143; 359/161; 359/181
[58] Field of Search ...................... 455/69, 522; 359/181, 359/172, 158, 110, 143, 161, 115

[56] References Cited

U.S. PATENT DOCUMENTS

| | | | |
|---|---|---|---|
| 4,298,280 | 11/1981 | Harney | 356/5 |
| 4,325,079 | 4/1982 | Little | 358/120 |
| 4,325,146 | 4/1982 | Lennington | 359/143 |
| 4,397,042 | 8/1983 | Tsujii et al. | 359/181 |
| 5,229,593 | 7/1993 | Cato | 359/110 |
| 5,333,175 | 7/1994 | Ariyavisitakul et al. | 379/58 |
| 5,526,161 | 6/1996 | Suzuki et al. | 359/172 |

*Primary Examiner*—Leslie Pascal
*Attorney, Agent, or Firm*—Simmons, Perrine, Albright & Ellwood

[57] ABSTRACT

An apparatus and method for use in a wireless communication system. The system having a driver accepting a data bit signal as input and converting the data bit signal into an output signal. The system also having an electromagnetic signal generator accepting the output signal from the driver and generating a signal suitable for wirelessly communicating the data represented by the data bit signal. The driver also causing a brief, high amplitude spike to travel to the signal generator as a component of the output signal to output a corresponding brief, high amplitude signal to also be wirelessly communicated.

50 Claims, 3 Drawing Sheets

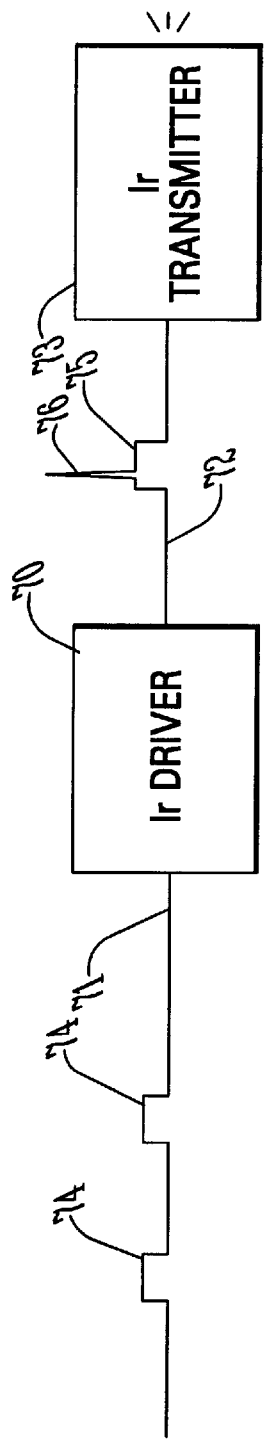

HIGH AMPLITUDE SIGNAL SUPPLEMENT TO AID RECOVERY OF A LOW AMPLITUDE SIGNAL

CROSS REFERENCE TO RELATED APPLICATIONS

The present application claims the benefit under 35 U.S.C. 119(e) of copending U.S. Provisional Application No. 60/011,892, filed Feb. 20, 1996, and copending U.S. Provisional Application No. 60/010,230, filed Jan. 19, 1996.

TECHNICAL FIELD

The present invention relates generally to a method and apparatus for enhancing reception of a low amplitude electromagnetic signal. More specifically, this invention relates to enhancing reception by generating a brief high amplitude spike signal during the transmission of a low amplitude time pulse to facilitate reception.

BACKGROUND OF THE INVENTION

The present invention is particularly applicable to communication systems employing electromagnetic radiation in the infrared range of the spectrum. An example would be an IrDA communication system. IrDA interfaces are being implemented, for instance, to establish a communications link between a computer and a printer. IrDA communication can also be used for computer to computer communications as well as for communication between a variety of other types of peripherals.

To date, the range of such communication systems has been hampered by 1) the need to ensure safety by limiting the system's energy output, 2) the desire to provide a system that does not require the transmitting unit to be aimed with pinpoint accuracy toward the receiving unit, and 3) the need to implement a low cost, low power solution. Safety issues arise, for example, because the human eye can be damaged by excessive exposure to the infrared signal. Presently, for example, it is not uncommon for devices communicating via IrDA protocol to be required to be within one or two meters of each other to establish reliable communications.

It would be highly desirable to develop an IrDA system capable of communicating efficiently over greater distances. For instance, a range of ten meters or more would be very useful in many applications. Accordingly, it is the aim of this invention to create a system for enabling IrDA communications over such distances. If implemented in a low cost and "eye safe" manner, such a result would greatly increase the variety of devices to which this technology would be applied.

SUMMARY OF THE INVENTION

As stated, this invention relates to enhancing reception by generating a relatively brief high amplitude spike signal to accompany a lower-amplitude time pulse to assist recording of the signal by a receiver. The present invention accomplishes this goal via a hardware component, an IrDA driver, which takes as its input a digital signal. The driver outputs a current waveform for driving an infrared transmitter. The transmitter generates a stream of relatively low amplitude data signals.

In the present invention, however, the driver also outputs a signaling component which will cause the Ir transmitter to generate a brief spike signal of significantly greater total energy than the total energy of the relatively low amplitude data signal. This brief spike signal travels within, or at the beginning, of the longer duration, lower-amplitude data signal. The spike could also travel as the ending of the accompanying lower-amplitude signal. The receiver is designed to detect the presence of the brief spike signal and of the lower-amplitude signal.

The greater amplitude of the brief spike will enable it to be detected at greater distances from the transmitter than would be possible if the lower-amplitude signal were transmitted alone. The lower-amplitude signal, however, will aid somewhat with detection even over longer distances. Therefore, the lower-amplitude signal retains a functional purpose. The duration of the higher-amplitude spike can be made so brief that the energy transmitted by the signal will not cause safety levels to be exceeded. For example, the signal would not cause damage to an eye.

Upon detecting the signal, the receiver system, with the aid of a suitable electronic filter or processing system for example, can remove the noise associated with the signal and can proceed to recover it. In the absence of the higher energy spike, the signal may well be undetectable at distances greater than one or two meters from the transmitter.

BRIEF DESCRIPTION OF THE DRAWINGS

FIG. 3B depicts two higher amplitude spikes traveling within the duration of a lower amplitude component.

FIG. 7 is a block diagram of the possible components of the infrared transmission system of the present invention and which includes the associated waveforms.

DETAILED DESCRIPTION OF THE INVENTION

Figure 1:
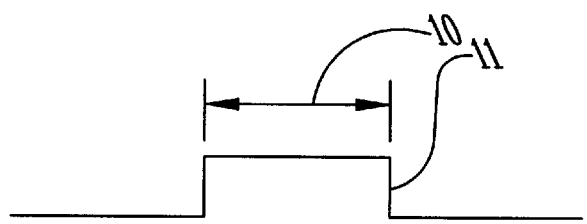
FIG. 1 depicts the duration of a typical bit duration signal, e.g. representing a logical bit state input.

FIG. 1 represents the waveform of a typical bit signal having a standard duration 10, FIG. 1 or 74, FIG. 7. This is the type of digital representation which is converted for communication via, for example, an infrared transmission. The duration of the infrared signal transmitted in an IrDA communication is set by the IrDA protocol at three-sixteenths the duration of the bit signal. The range of an IrDA signal is currently limited, by virtue of the restrictions of the IrDA standard, to one or two meters.

Figure 2:
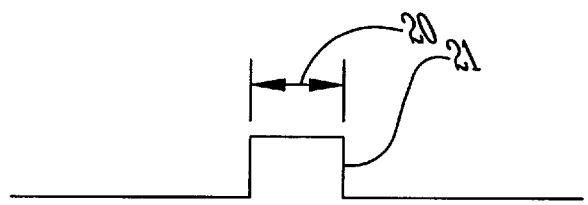
FIG. 2 depicts an IrDA waveform representing the bit information of FIG. 1.

FIG. 2 shows an IrDA-type waveform 21. The duration of this waveform is indicated at 20 of FIG. 2. Such a waveform may be generated by an Ir driver 70, FIG. 7, to be, for example, three-sixteenths the duration of the typical bit duration 11.

Figure 3A:
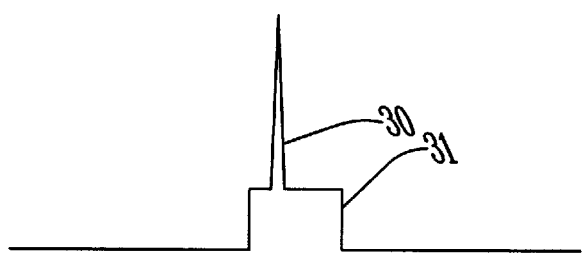
FIGS. 3A and 3B depicts a brief high-level spike traveling within the duration of an IrDA waveform.

The Ir driver 70, FIG. 7, could, when generating the Ir waveform 21, also generate the spike 30, FIG. 3A, or 76, FIG. 7. The timing of the spike could be regulated with the underlying system clock. Further, if the clock was running at an interval equal to one-sixteenth of the typical bit signal duration 10, FIG. 1, the spike duration could be conveniently set at one-sixteenth of the typical bit signal duration. This would correspond to one-third the duration of the Ir waveform 21. It follows that such a spike could be generated during the first, second or last one-third of the duration of the Ir waveform. As an example, FIG. 4 shows a spike 40 generated to correspond with the first one-third of the Ir waveform 41.

Figure 4:
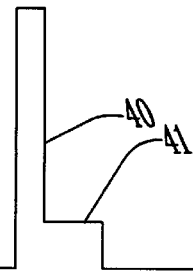
FIG. 4 depicts a brief high-level spike traveling at the beginning of an IrDA waveform.

The amplitude of the spike 30, FIG. 3A, or 40, FIG. 4, can be many times greater than the amplitude of the regular IrDA waveform 21, FIG. 2. Further, the spike amplitude could be determined by the communication system. In a preferred embodiment, for example, a spike could accompany each bit of a data stream unit. The data stream unit could be composed of a start bit, data bits, perhaps a parity bit, and an end bit.

Figure 3B:
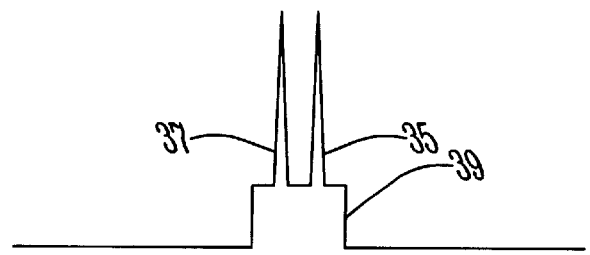

If the receiving and transmitting devices are close enough together to communicate via the regular IrDA protocol, the spike could be omitted. This would save energy. Also, if a spike was used at close range, it could saturate the receiver. When a spike is used, it may be necessary in some applications to place two spikes 35 and 37, FIG. 3B, on each start bit in order to interface with the receiving device. Two spikes 35 and 37, FIG. 3B, could also be placed on other pulses as long as the safety requirements were not exceeded.

When a transmitting device initiates a communication, a long range mode could be employed wherein each bit transmitted could include the high-amplitude spike. If the communicating devices were too close to each other, the receiver would become saturated by the presence of the spike. The receiving system would take note of the saturation and would thereupon send a reply signal to the transmitting device in a short range mode at a reduced energy level. For instance, the receiver could reply with a signal having the characteristics of a typical IrDA waveform 21, FIG. 2.

If the receiver was not saturated by the long range mode, high amplitude spike, it could signal a successful reception. For example, the receiving device could transmit a high amplitude spike as an acknowledgment signal. After receiving such an acknowledgment, the transmitting device could proceed to transmit its information in the long range mode.

However, upon receiving the lower energy, short range signal as a reply, the transmitting device could reinitiate communication in a short range mode at the lower energy level. For example, the transmitting device could transmit its data via the typical IrDA signal 21, FIG. 2, which does not contain a brief, higher-amplitude spike component. For the purposes of this discussion, the short range mode may be appropriate when distances of zero meters to approximately one meter separate the communicating devices. The long range mode might be employed when the separation distance is approximately three-fourths of a meter to approximately ten meters.

Figure 5A:
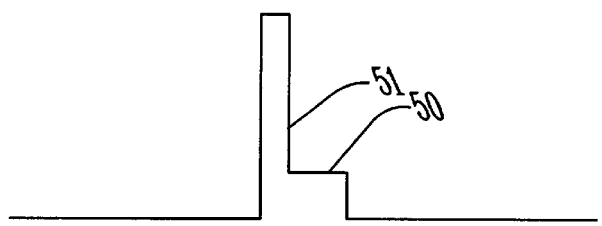
FIGS. 5A, 5B and 5C depict some of the signals capable of being generated by a refined system tailored to operate in modes which are particularly well-suited for the distance which separates the communicating devices at the time of the communication.

A refined system could further include the capability to adjust the amplitude of the spike so that an intermediate-energy spike could be used in an intermediate range mode. In this more refined system, upon becoming saturated by a received long range mode communication, the receiving device could reply in an intermediate mode where a spike 51, FIG. 5A, having an intermediate amplitude is added to each bit of the reply. If the transmitting device was not saturated by the intermediate range signal, it would reinitiate the communication in the intermediate range mode. However, if the transmitting device had been saturated by receiving the intermediate range signal, it would reinitiate the communication in the short range mode with no accompanying spike 53, FIG. 5C.

Figure 5B:
Figure 5C:
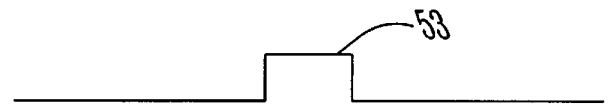

It can readily be seen that further levels of refinement can be obtained by having a system capable of generating signals for a plurality of intermediate range modes which differ from each other by the amplitude of the spike that is added to the standard signal. FIG. 5B shows an additional intermediate range mode where the spike 52 has an amplitude and an energy which is less than that of the other intermediate range mode spike 51, FIG. 5A. Use of the intermediate range modes can save power and can help increase the reliability of the communication sessions.

The spike must be of brief duration so that eye injury to users and bystanders is avoided. For example, the spike can be regulated to have a duration on the order of approximately ten microseconds. Safety can be further increased by designing the transmitter to shut down if requested to output a signal exceeding the safety standards. The power to generate the spike can be on the order of one watt per steradian to several watts per steradian. By way of comparison, the power required to generate the lower-amplitude signal 21, FIG. 2, or 53, FIG. 5C, would be approximately 400 milliwatts per steradian.

The present invention can be used over a variety of baud rates. As the baud rate increases, however, the spike will use a greater share of the operating power. This may be an important consideration for some portable units with limited power supplies or without ready access to quick recharge stations. However, a ten microsecond spike duration may be useful at baud rates as high as 9600, for example, with present low cost infrared transmitters and receivers. Further, higher baud rates will require a more sensitive receiver. This may tend to increase the cost of the system.

Figure 6:
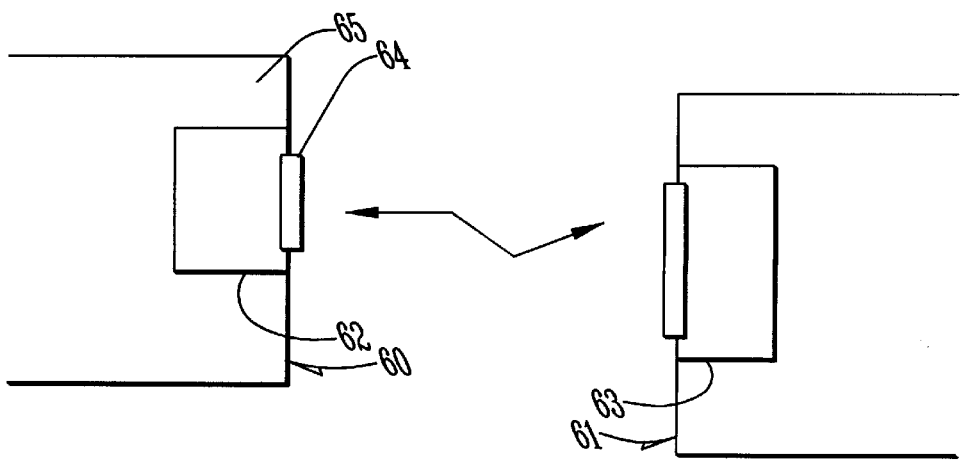
FIG. 6 shows two devices capable of communicating via the system of the present invention.

FIG. 6 depicts a first station 60 which could be a portable or stationary computer for example, which can include a user or data interface 65, and which includes the Ir transceiver system 62 with a transmissive portal 64. The first station 60 could alternatively be a printer, or any of a variety of such devices. It can be virtually any type of device having information to communicate.

A second station 61 is also shown in FIG. 6. The second station also contains an Ir transceiver system 63. Acknowledgment of a transmitted message can be returned to the transmitting station by means of a spike and data signal combination or solely by means of a spike or spikes. Of course, the second station 61 can be any of the types of devices described for the first station 60.

FIG. 7 provides an overview of the transmission system described above. The Ir driver 70 accepts as input 71 bit durations 74. The Ir driver processes the bit data and outputs 72 a current waveform 75, 76 to cause Ir transmitter 73 to transmit an infrared data signal, including the spike when necessary, to a remote receiver.

It is a further feature of the disclosed invention that the frequency of the spikes themselves can serve as an additional conveyor of information. For instance, the spikes could be used to communicate the rate at which the data is being transmitted. In a similar fashion, the spikes could be used to convey other information pertinent to the system or the data. It may also be desirable to send an initial spike to wake up the receivers within range. A sequence of spikes could be sent as an address to initiate communication with a specific receiver or receivers. It follows that a spike could then be returned as a "ready" or as an "acknowledgment" type signal.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A wireless communication system, comprising:

(a) a driver component accepting a data bit signal as input and converting a data bit signal into an output signal; and (b) an electromagnetic signal generator accepting an output signal from said driver component and generating an electromagnetic data pulse suitable for wirelessly communicating data represented by a corresponding data bit signal;

said driver component generating a high amplitude spike as an output signal component, said electromagnetic signal generator generating a high amplitude electromagnetic pulse component having an amplitude higher than that of the electromagnetic data pulse, the high amplitude electromagnetic pulse component corresponding to the high amplitude spike, and the high amplitude electromagnetic pulse component being superimposed on the electromagnetic data pulse to aid detection of the electromagnetic data pulse.

2. A method for creating and transmitting a signal for wireless communication, comprising the steps of:

(a) generating a data bit signal corresponding to data to be communicated;

(b) inputting the data bit signal into a driver component;

(c) converting the data bit signal into a driver signal and adding a higher amplitude spike component to a portion of the driver signal;

(d) outputting the driver signal from said driver component, with the higher amplitude spike component, to an electromagnetic signal generator; and (e) converting the driver signal into an electromagnetic pulse suitable for wireless communication, the electromagnetic pulse having an electromagnetic spike component superimposed thereon corresponding to the higher amplitude spike component of the driver signal.

3. A method for wireless communication over a variety of distances, comprising the steps of:

(a) generating an electromagnetic signal, suitable for wireless communication between a transmitting device and a receiving device, the electromagnetic signal having a higher amplitude spike component for communicating in a longer-range mode with the receiving device;

(b) receiving, by a receiver of the receiving device, the electromagnetic signal with its higher amplitude spike component;

(c) evaluating the received electromagnetic signal to determine whether the receiver has been saturated by the electromagnetic signal;

(d) replying to the transmitting device, after having determined that the receiver of the receiving device had been saturated by the received electromagnetic signal, by sending an electromagnetic reply signal having an intermediate amplitude spike component suitable for communicating in an intermediate-range mode;

(e) receiving and evaluating, by the transmitting device, the electromagnetic reply signal with its intermediate amplitude spike component; and (f) reinitiating communication with the receiving device, in the intermediate-range mode, by transmitting an electromagnetic reinitiation signal having an intermediate amplitude spike component, if the receiving by a receiver of the transmitting device did not result in saturation of the receiver of the transmitting device.

4. The method according to claim 3, wherein the electromagnetic signal is a light pulse.

5. The method according to claim 3, wherein the electromagnetic signal is an infrared pulse.

6. The method according to claim 3, wherein, when it is determined that the receiver has not been saturated after receiving an electromagnetic signal with a higher amplitude spike component, communication signals continue to be generated with a higher amplitude spike component.

7. The method according to claim 3, wherein, when it is determined that the receiver has not been saturated after receiving an electromagnetic signal with an intermediate amplitude spike component, communication signals continue to be generated with an intermediate amplitude spike component.

8. The method according to claim 3, wherein the electromagnetic signal, with no accompanying higher amplitude component or intermediate amplitude component, is a standard IrDA signal.

9. The method according to claim 3, wherein an initial higher amplitude spike is generated to wake up the receiving device.

10. A communication system, comprising an electromagnetic pulse generator capable of transmitting an electromagnetic pulse with a lower amplitude component and a higher amplitude component superimposed thereon, the electromagnetic pulse generator being capable of communicating with a remotely-located receiving device without being physically connected therewith, and wherein the communication system will not transmit an electromagnetic pulse if safety standards will be exceeded.

11. The communication system according to claim 10, wherein said electromagnetic pulse generator comprises a light pulse generator.

12. The communication system according to claim 10, wherein said electromagnetic pulse generator comprises an infrared pulse generator.

13. The communication system according to claim 10, wherein said electromagnetic pulse generator generates the higher amplitude component to occur at a beginning section of the electromagnetic pulse.

14. The communication system according to claim 10, wherein said electromagnetic pulse generator generates the higher amplitude component to occur at an ending section of the electromagnetic pulse.

15. The communication system according to claim 10, wherein said electromagnetic pulse generator generates the higher amplitude component to occur at an intermediate section of the electromagnetic pulse.

16. The communication system according to claim 10, wherein said electromagnetic pulse generator comprises an infrared driver.

17. The communication system according to claim 10, wherein the higher amplitude component has a duration that is less than one-half of the electromagnetic pulse's total duration.

18. The communication system according to claim 10, wherein the higher amplitude component has a duration that is approximately one-third the electromagnetic pulse's duration.

19. The communication system according to claim 10, wherein the higher amplitude component has an amplitude that is at least two times greater than the electromagnetic pulse's lower amplitude component.

20. The communication system according to claim 10, wherein the communication system also has a closer-range mode wherein the higher amplitude component is not generated.

21. The communication system according to claim 10, further comprising a remote device receiving the electromagnetic pulse generated by the electromagnetic pulse generator.

22. The communication system according to claim 21, wherein said remote device returns a reply signal indicating whether the electromagnetic pulse was readable by the remote device.

23. The communication system according to claim 21, wherein an initial higher amplitude spike is generated to wake up the remote device.

24. The communication system according to claim 10, wherein the communication system has at least three modes of operation each mode being appropriate for a different range of operation.

25. The communication system according to claim 10, wherein the communication system has an intermediate-range mode wherein the higher amplitude component has an amplitude appropriate for intermediate-range operation.

26. The communication system according to claim 10, wherein the higher amplitude component is included to extend the communication system's operating range.

27. The communication system according to claim 26, wherein the higher amplitude component is included to also communicate data.

28. The communication system according to claim 10, wherein the higher amplitude component is included to communicate data.

29. The communication system according to claim 10, wherein the electromagnetic pulse also has an additional higher amplitude component.

30. A method for communicating via electromagnetic pulses, comprising the steps of:
   (a) inputting a data signal;
   (b) adding a higher amplitude signal to a portion of the data signal; and
   (c) outputting an electromagnetic pulse, the pulse having a lower amplitude component representing the data signal and a higher amplitude component, superimposed on the lower amplitude component, representing the higher amplitude signal, the higher amplitude component's duration being approximately one-third as long as the electromagnetic pulse's duration.

31. The method according to claim 30, wherein the electromagnetic pulse is a light pulse.

32. The method according to claim 30, wherein the electromagnetic pulse is an infrared pulse.

33. The method according to claim 30, wherein the higher amplitude component is located at a beginning of the electromagnetic pulse.

34. The method according to claim 30, wherein the higher amplitude component is located at an end portion of the electromagnetic pulse.

35. The method according to claim 30, wherein the higher amplitude component is located at an intermediate portion of the electromagnetic pulse.

36. The method according to claim 30, wherein the higher amplitude component's duration is less than one-half of the electromagnetic pulse's duration.

37. The method according to claim 30, wherein the higher amplitude component's amplitude is at least two times greater than the electromagnetic pulse's lower amplitude component.

38. The method according to claim 30, wherein the higher amplitude component's amplitude is many times greater than the electromagnetic pulse's lower amplitude component.

39. The method according to claim 30, wherein the electromagnetic pulse also has an additional higher amplitude component.

40. A method for wireless communication, comprising the steps of:
   (a) receiving, by a receiving device, an electromagnetic pulse having a higher amplitude component and a lower amplitude component;
   (b) evaluating whether the received electromagnetic pulse is readable; and
   (c) sending, after determining that a readable pulse has been received, an electromagnetic reply pulse having an amplitude similar to the amplitude of the received higher amplitude component.

41. The method according to claim 40, wherein the electromagnetic reply pulse also has a lower amplitude component.

42. The method according to claim 40, further comprising the step of sending by the receiving device, after determining that a readable electromagnetic pulse had not been received, an electromagnetic reply pulse having an amplitude similar to the amplitude of the received lower amplitude component.

43. The method according to claim 40, further comprising the step of sending by the receiving device, after determining that a readable electromagnetic pulse had not been received, an electromagnetic reply pulse having an intermediate amplitude.

44. The method according to claim 43, further comprising the step of generating an electromagnetic reinitiation pulse having an intermediate amplitude component and a lower amplitude component after receiving an electromagnetic reply pulse having an intermediate amplitude.

45. The method according to claim 44, further comprising the steps of evaluating the received electromagnetic reinitiation pulse with its intermediate amplitude component to determine whether a readable electromagnetic reinitiation pulse has been received, and then sending a second electromagnetic reply pulse having an amplitude similar to the amplitude of the received lower amplitude component after determining that a readable electromagnetic reinitiation pulse had not been received.

46. The method according to claim 45, further comprising the steps of receiving the second electromagnetic reply pulse from the receiving device and generating a second electromagnetic reinitiation pulse having an amplitude similar to the amplitude of the received lower amplitude second electromagnetic reply pulse.

47. The method according to claim 44, further comprising the step of sending, after determining that a readable electromagnetic reinitiation pulse having an intermediate amplitude component has been received, a second electromagnetic reply pulse having an amplitude similar to the amplitude of the received intermediate amplitude component.

48. The method according to claim 40, wherein the electromagnetic pulse received by the receiving device has the higher amplitude component and also has an additional higher amplitude component.

49. A method for wireless communication, comprising the steps of:
  (a) receiving, by a receiving device, an electromagnetic pulse having a higher amplitude component and a lower amplitude component;
  (b) evaluating whether the received electromagnetic pulse is readable; and
  (c) sending, after determining that a readable pulse has not been received, an electromagnetic reply pulse with a first component having an amplitude lower than the amplitude of the received higher amplitude component.

50. The method according to claim 49, wherein the electromagnetic reply pulse has a second component with an amplitude lower than that of the first component.

* * * * *